US006478003B2

(12) United States Patent
Laimböck

(10) Patent No.: US 6,478,003 B2
(45) Date of Patent: Nov. 12, 2002

(54) PISTON FOR A FOUR-STROKE INTERNAL COMBUSTION ENGINE

(75) Inventor: Franz Laimböck, Thal (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 09/928,746

(22) Filed: Aug. 14, 2001

(65) Prior Publication Data

US 2002/0023609 A1 Feb. 28, 2002

(30) Foreign Application Priority Data

Aug. 24, 2000 (AT) ........................................ 621/2000 U

(51) Int. Cl.[7] .................................................... F16J 1/00
(52) U.S. Cl. .................................................... 123/193.6
(58) Field of Search ............................ 123/193.6, 668; 92/212; 277/468, 168; 29/888.074

(56) References Cited

U.S. PATENT DOCUMENTS 3,695,150 A * 10/1972 Salzmann ................ 123/193.6
4,306,489 A * 12/1981 Driver et al. ................ 92/212
4,346,685 A 8/1982 Fujikawa
4,669,369 A 6/1987 Holt et al.
4,945,864 A * 8/1990 Solomon et al. ......... 123/193.6
5,035,210 A * 7/1991 Arai et al. ............... 123/193.6
5,133,563 A * 7/1992 Casellato .................... 277/168
5,430,938 A * 7/1995 Rao et al. .............. 29/888.074
5,598,763 A * 2/1997 Rao et al. ...................... 92/212
5,619,962 A * 4/1997 Ikegaya et al. ............. 123/668
5,884,600 A * 3/1999 Wang et al. ............. 123/193.6
6,199,868 B1 * 3/2001 Evans ........................ 277/468

FOREIGN PATENT DOCUMENTS

DE 2646922 4/1978
EP 0144145 6/1985
WO 94/20744 9/1994

* cited by examiner

*Primary Examiner*—Marguerite McMahon
(74) *Attorney, Agent, or Firm*—Dykema Gossett, PLLC

(57) ABSTRACT

The invention relates to a piston 1 for a four-stroke internal combustion engine, comprising a piston head 2 with a piston top 3 on the side of the combustion space, and a first groove 5 next to the piston top 3 holding a compression ring 9 and a second groove 6 further apart from the piston top 3 holding an oil scraper ring 22 being formed in the wall 4 of the piston head 2, and a piston ring land 7 being formed between the two grooves 5, 6, and further comprising a piston skirt 10 adjacent to the piston head 2, whose wall 11 includes first guide faces 12 for guiding the piston 1 in a cylinder, as well as a piston pin bore 13 carrying a piston pin 14. To reduce oil consumption and diminish frictional losses, it is provided that the ring land 7 between the two grooves 5, 6 be designed as second guide face 17 for guiding the piston 1.

29 Claims, 2 Drawing Sheets

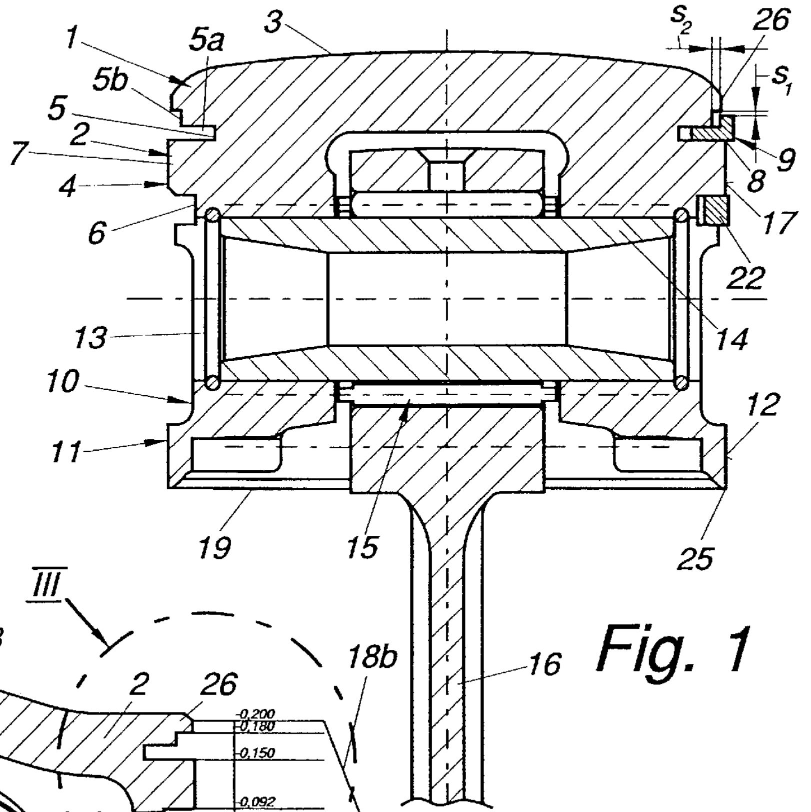
Fig. 1
Fig. 2
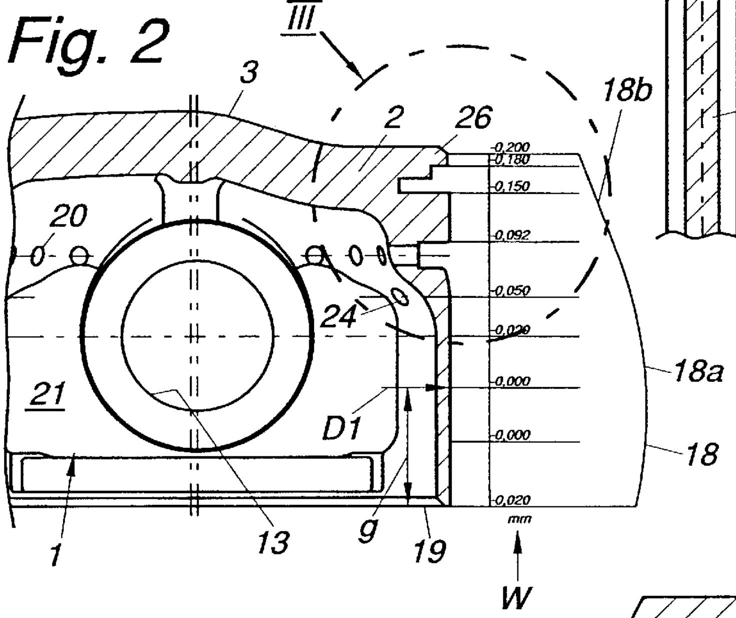
Fig. 4
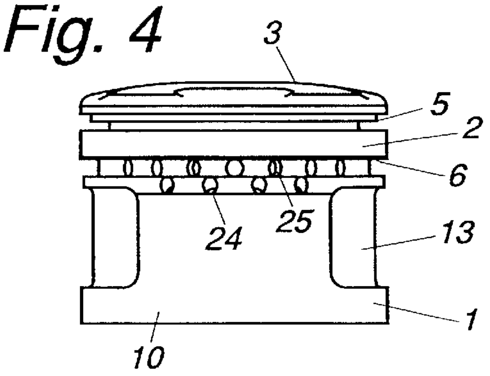
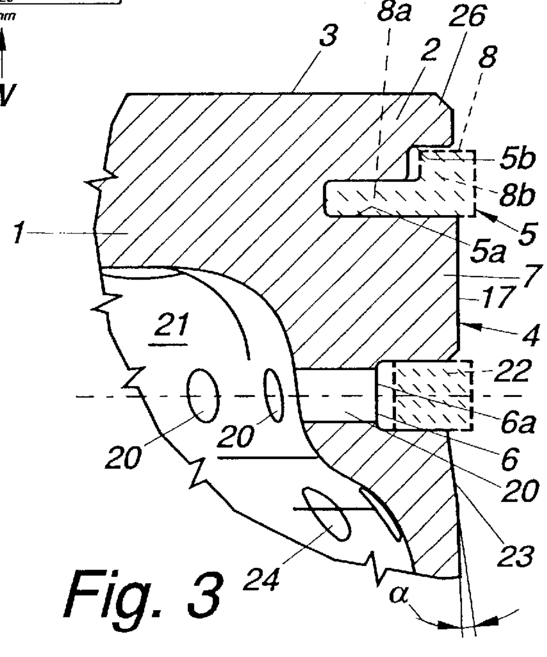
Fig. 3

PISTON FOR A FOUR-STROKE INTERNAL COMBUSTION ENGINE

BACKGROUND OF THE INVENTION

The invention relates to a piston for a four-stroke internal combustion engine, comprising a piston head with a top face on the side of the combustion space, which will henceforth be referred to as piston top, and a first groove next to the piston top holding a compression ring and a second groove further apart from the piston top holding an oil scraper ring being formed in the wall of the piston head, and a piston ring land being formed between the two grooves, and further comprising a piston skirt adjacent to the piston head, whose wall includes first guide faces for guiding the piston in a cylinder, as well as a piston pin bore carrying the piston pin.

Pistons for four-stroke engines usually have more than two piston rings, to provide for adequate compression in addition to ensuring that enough oil is scraped off the cylinder walls. Piston friction and accompanying losses will increase, however, with the number of piston rings.

SUMMARY OF PRIOR ART

In U.S. Pat. No. 5,133,563 a piston is described whose piston head is provided with only two piston rings. The lower, second groove is designed to carry an L-ring whose shorter leg points towards the crankcase. This is intended to minimize oil consumption.

SUMMARY OF THE INVENTION

It is an object of this invention to further reduce oil consumption in a piston of the above mentioned type.

According to the invention this object is achieved by configuring the piston ring land between the two grooves as second guide face for guiding the piston. In addition to the piston rings this second guide face which is thus generated between the two grooves, will provide an additional seal, which will significantly reduce oil consumption compared to known piston types with two piston rings. In addition, the well-known phenomenon of piston slap will be reduced or even eliminated, and piston noise will be kept low.

In order to further improve sealing, it is proposed that the first groove be given an essentially L-shaped cross-section to hold the compression ring designed as L-ring, the longer leg of the "L" of the first groove extending in the wall of the piston head in radial direction, and the shorter leg of the "L" in axial direction, pointing towards the piston top, the long, radial leg of the first groove preferably constituting a radial guide for the L-ring. The short, axial leg of the first groove has larger dimensions in radial and axial direction than the corresponding compression part of the L-ring to be held in it. As a consequence, a gap will form between piston head and piston ring, into which compressed gas may penetrate, thus forcing the L-ring outwards. As a result, sealing will increase with an increase in pressure. The piston ring thus will require only little preloading and friction losses will be kept low.

Excellent oil scraping properties with little friction may be obtained by providing the second groove with an essentially rectangular cross-section for holding the oil scraper ring, preferably with several first oil drain passages leading into the piston interior from the bottom of the second groove. The first oil drain passages departing from the bottom of the second groove will allow the excess oil scraped off from the cylinder wall to flow towards the interior of the piston. To improve the transport of oil from the oil scraper ring to the piston interior it is proposed in further development of the invention that adjacent to the second groove on the side facing the piston skirt a bevelled surface inclined relative to the second groove be formed in the piston wall and that a plurality of second oil drain passages depart from the bevelled surface to lead into the piston interior.

For structural reasons no oil drain passages are possible in the area of the piston pin bore. To ensure oil drainage in this area as well the piston pin bore will advantageously intersect with the second groove. In this way excess oil is allowed to flow directly into the piston pin bore, thus lubricating the piston pin bearing as an additional benefit.

In order to minimize the thermal load on the compression ring a head land is formed in the piston head between the piston top and the first groove.

For further support of oil scraping from the cylinder walls it is proposed in a preferred variant of the invention that the rim of the piston skirt facing the crankcase have a sharp edge. The sharp edge of the piston skirt rim acts as an oil scraper removing the excess oil film from the cylinder wall.

To reduce friction losses it will be of advantage if the piston pin bearing is configured as a needle bearing.

The piston is preferably made of light alloy, and more preferably of aluminium alloy. Friction in the area of the guide faces is preferably reduced by providing that at least one guide face have a coating, preferably of a molybdenum compound.

BRIEF DESCRIPTION OF THE DRAWINGS

Following is a more detailed description of the invention with reference to the accompanying drawings, in which FIG. 1 is a section through the piston described by the invention along line I—I in FIGS. 5 and 6, FIG. 2 is a section through the piston along line II—II in FIG. 5, FIG. 3 shows detail III of the piston from FIG. 2, FIG. 4 is a side view of the piston.

DETAILED DESCRIPTION OF THE PREFERRED EMBODIMENT

Figure 5:
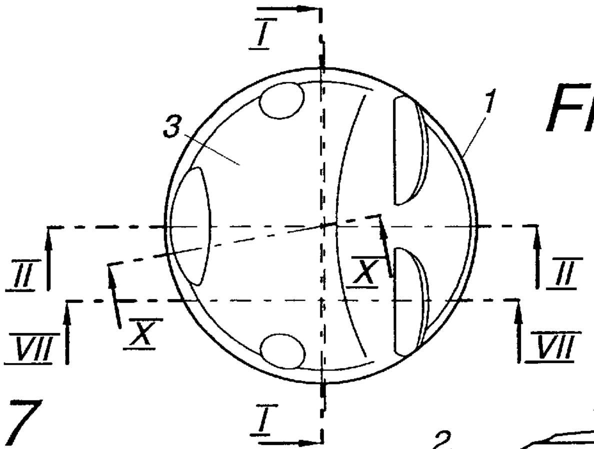
FIG. 5 is a view of the piston from above.

The piston 1 of a four-stroke internal combustion engine has a piston head 2 with a piston top 3. In the wall 4 of the piston head 2 a first groove 5 and a second groove 6 are formed, the first groove 5 being nearer to the piston top 3. Between the first groove 5 and the second groove 6 a ring land 7 is provided. The first groove 5 has an L-shaped cross-section, the longer leg 5*a* extending radially in the wall 4 and acting as a guide for a compression ring 9 configured as L-ring. The shorter leg 5*b* of the first groove 5 extends axially in the direction of the piston top 3. The shorter leg 5*b* has dimensions that are larger both in radial and axial direction than those of the corresponding sealing part 8*b* of the L-ring 8. The guiding part 8*a* is positioned in the long leg 5*a* of the first groove 5. Between the piston head 2 and the L-ring 8 a predefined gap $s_1$, $s_2$ is thus formed into which the compressed gas will penetrate, pressing the L-ring against the cylinder wall and thus creating a gas-tight seal. The second groove 6, in which an oil scraper ring 22 is held, has a rectangular cross-section. For illustration, the compression ring 9 and the oil scraper ring 22 are entered on the right side of the piston 1 in FIG. 1 and, by broken lines, in FIG. 3.

The piston head 2 is joined by a piston skirt 10, whose wall 11 forms first guide faces 12 for guiding the piston 1 in the cylinder not shown here in detail. In the piston skirt 10 a piston pin bore 13 is positioned for insertion of a piston pin 14. As is seen in FIG. 1, the piston pin bearing 15 between the piston pin 14 and the connecting rod 16 is configured as a needle bearing, so that friction may also be minimized in this area.

The area of the ring land 7 between the first groove 5 and the second groove 6 will act as a second guide face 17 for the piston 1 against the cylinder wall. This second guide face 17 will prevent piston slap and thus improve noise reduction. The second guide face 17 also has additional oil scraping functions and will significantly reduce oil consumption.

In FIG. 2 curve 18 is a schematical representation of the grinding finish of the piston 1, with a toroidal section 18*a* and a conical section 18*b*. The grinding values W are determined with reference to a maximum nominal diameter D1 of the piston 1, which is at a distance g from the lower rim 19 of the piston skirt 10.

From the bottom 6*a* of the second groove 6 first oil drain passages 20 lead into the piston interior 21, in order to drain excess oil stripped off the cylinder wall by the oil scraper ring 22. As the piston 1 travels downwards, however, oil will collect at the lower edge of the oil scraper ring 22. To permit proper drainage of this oil a bevelled surface 23 is provided in the piston wall 4 on the side of the second groove 6 facing the piston skirt 10, said bevel 23 being inclined relative to the second groove 6. The inclination angle $\alpha$ between the bevel 23 and the wall area 4 is about 7° to 10°, and preferably 8° to 9°. From the bevelled surface 23 a number of second oil drain passages 24 lead into the piston interior 21, so that a sufficient amount of oil will be drained from this area as well. The oil drain passages 20, 24 may be obtained by cutting, for example.

Figure 6:
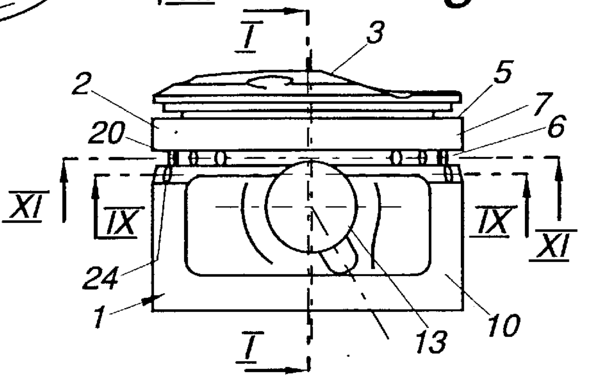
FIG. 6 is another side view of the piston in the direction of the axis of the piston pin.
Figure 7:
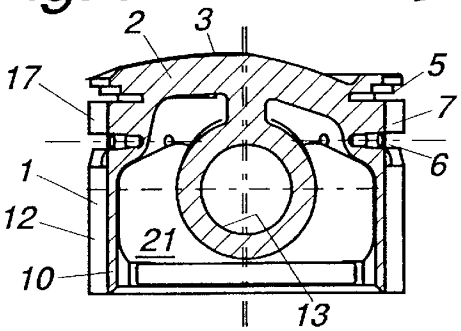
FIG. 7 is a section through the piston along line VII—VII in FIG. 5.
Figure 8:
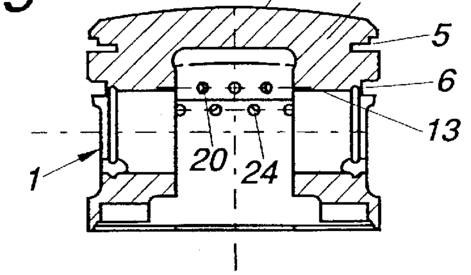
FIG. 8 is a section through the piston along line I—I in FIG. 5 and FIG. 6, respectively.

For structural reasons no oil drain passages 20, 24 will be possible in the area of the piston pin bore 13. To ensure oil drainage in this area as well the piston pin bore 13 is positioned in such a way that the upper part of the piston pin bore 13 will intersect with the second groove 6, as is clearly shown in FIGS. 6 and 8. As a consequence, excess oil is allowed to flow in the direction of the piston pin bore and will penetrate into the piston pin bearing. In this way an additional lubrication of the piston pin will be achieved.

Figure 9:
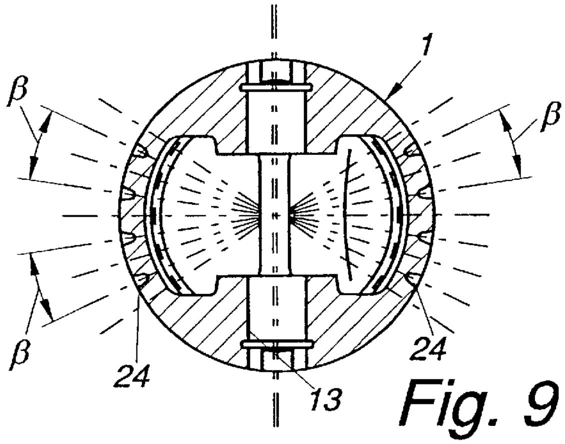
FIG. 9 is a section through the piston along line IX—IX in FIG. 6.
Figure 10:
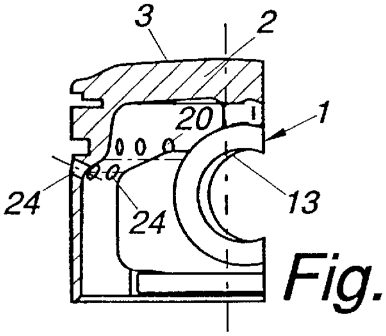
FIG. 10 is a section through the piston along line X—X in FIG. 5.
Figure 11:
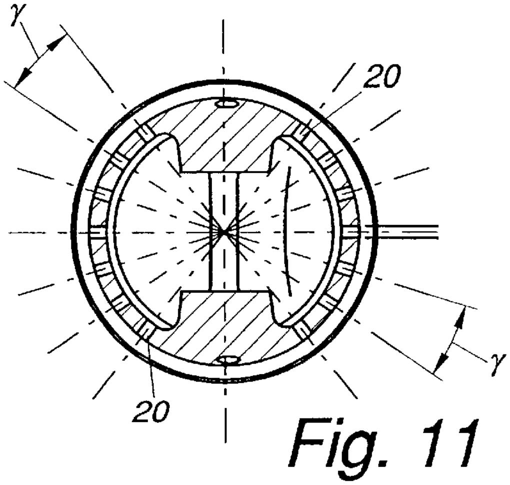
FIG. 11 is a section through the piston along line XI—XI in FIG. 6.
Figure 12:
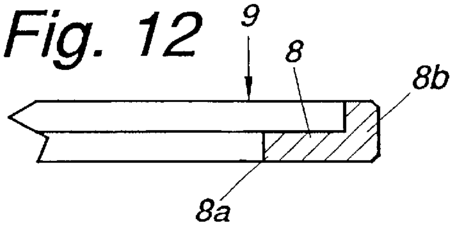
FIG. 12 shows a compression ring of the piston designed as L-ring.

As is seen in FIGS. 9 and 11, the first and second oil drain passages 20, 24 are staggered at regular intervals along the periphery of the wall 4, the angles $\beta$, $\gamma$ in between the axes of oil dran passages 20, 24 amounting to about 17° in the embodiment of the invention shown. For example, fourteen first oil drain passages 20 and eight second oil drain passages 24 may be provided.

The rim 19 of the piston skirt 10 has a sharp edge, such that the edge 25 will scrape off excess oil from the cylinder wall when the piston 1 travels downwards. This will reduce oil consumption considerably.

Between the piston top 3 and the first groove 5 a head land 26 is provided to diminish the load of the compression ring 9.

The piston 1 is made of light alloy, for example an eutectoid aluminium alloy with a silicon content of about 12%. To reduce friction between the guide faces 12, 17 and the cylinder wall, the guide faces 12, 17 may be provided with a coating, for example using a molybdenum compound.

With a piston 1 as described in this paper frictional losses may be kept extremely small while oil consumption will be diminished.

What is claimed is:

1. A piston for a four-stroke internal combustion engine, comprising a piston head with a piston top on the side of the combustion space, and a first groove next to a piston top for holding a compression ring and a second groove further apart from the piston top for holding an oil scraper ring being formed in a wall of the piston head, and a piston ring land being formed between the two grooves, and further comprising a piston skirt adjacent to the piston head, whose wall includes first guide faces for guiding the piston in a cylinder, as well as a piston pin bore carrying a piston pin, wherein the ring land between the two grooves is designed as second guide face for guiding the piston, wherein the first groove has an essentially L-shaped cross-section to hold the compression ring designed as L-ring, a longer leg of the "L" of the first groove extending in the wall of the piston head in radial direction, and a shorter leg of the "L" in axial direction, pointing towards the piston top.

2. The piston according to claim 1, wherein the long, radial leg of the first groove constitutes a radial guide for the L-ring.

3. The piston according to claim 1, wherein the short, axial leg of the first groove has larger dimensions in radial and axial direction than a correspondingly shaped compression part of the L-ring, so that a predefined gap will be formed in the area of the short axial leg and the L-ring.

4. The piston according to claim 1, wherein the second groove has an essentially rectangular cross-section for holding the oil scraper ring, with several first oil drain passages leading into a piston interior from the bottom of the second groove.

5. The piston according to claim 1, wherein a head land is formed between the piston top and the first groove.

6. The piston according claim 1, wherein a rim of the piston skirt facing the crankcase has a sharp edge.

7. The piston according to claim 1, wherein a piston pin bearing is configured as a needle bearing.

8. The piston according to claim 1, wherein the piston is essentially made of light alloy.

9. The piston according to claim 8, wherein the piston is essentially made of aluminium alloy.

10. The piston according to claim 1, wherein at least one guide face is provided with a coating to reduce friction.

11. The piston according to claim 10, wherein the coating consists of a molybdenum compound.

12. A piston for a four-stroke internal combustion engine, comprising a piston head with a piston top on the side of the combustion space, and a first groove next to a piston top for holding a compression ring and a second groove further apart from the piston top for holding an oil scraper ring being formed in a wall of the piston head, and a piston ring land being formed between the two grooves, and further comprising a piston skirt adjacent to the piston head, whose wall includes first guide faces for guiding the piston in a cylinder, as well as a piston pin bore carrying a piston pin, wherein the ring land between the two grooves is designed as second guide face for guiding the piston, wherein adjacent to the second groove on the side facing the piston skirt a bevelled surface inclined relative to the second groove is formed in the wall, and wherein a plurality of oil drain passages depart from the bevelled surface to lead into the piston interior.

13. The piston according to claim 12, wherein the second groove has an essentially rectangular cross-section for holding the oil scraper ring, with several first oil drain passages leading into a piston interior from the bottom of the second groove.

14. The piston according to claim 12, wherein a head land is formed between the piston top and the first groove.

15. The piston according claim 12, wherein a rim of the piston skirt facing a crankcase has a sharp edge.

16. The piston according to claim 12, wherein a piston pin bearing is configured as a needle bearing.

17. The piston according to claim 12, wherein the piston is essentially made of light alloy.

18. The piston according to claim 17, wherein the piston is essentially made of aluminum alloy.

19. The piston according to claim 12, wherein at least one guide face is provided with a coating to reduce friction.

20. The piston according to claim 19, wherein the coating consists of a molybdenum compound.

21. A piston for a four-stroke internal combustion engine, comprising a piston head with a piston top on the side of the combustion space, and a first groove next to a piston top for holding a compression ring and a second groove further apart from the piston top for holding an oil scraper ring being formed in a wall of the piston head, and a piston ring land being formed between the two grooves, and further comprising a piston skirt adjacent to the piston head, whose wall includes first guide faces for guiding the piston in a cylinder, as well as a piston pin bore carrying a piston pin, wherein the ring land between the two grooves is designed as second guide face for guiding the piston, wherein a piston pin bore will intersect with the second groove.

22. The piston according to claim 21, wherein the second groove has an essentially rectangular cross-section for holding the oil scraper ring, with several first oil drain passages leading into a piston interior from the bottom of the second groove.

23. The piston according to claim 21, wherein a head land is formed between the piston top and the first groove.

24. The piston according claim 21, wherein a rim of the piston skirt facing a crankcase has a sharp edge.

25. The piston according to claim 21, wherein a piston pin bearing is configured as a needle bearing.

26. The piston according to claim 21, wherein the piston is essentially made of light alloy.

27. The piston according to claim 26, wherein the piston is essentially made of aluminum alloy.

28. The piston according to claim 21, wherein at least one guide face is provided with a coating to reduce friction.

29. The piston according to claim 28, wherein the coating consists of a molybdenum compound.

* * * * *